US006443173B1

(12) United States Patent
Thompson, Jr.

(10) Patent No.: US 6,443,173 B1
(45) Date of Patent: Sep. 3, 2002

(54) AUTOMATIC DRAIN FOR A FIRE PROTECTION SPRINKLER SYSTEM

(76) Inventor: Frank V. Thompson, Jr., 5857 Chimney Springs Rd., Buford, GA (US) 30518

( * ) Notice: Subject to any disclaimer, the term of this patent is extended or adjusted under 35 U.S.C. 154(b) by 0 days.

(21) Appl. No.: 09/801,176

(22) Filed: Mar. 5, 2001

(51) Int. Cl.[7] .................................................. F16T 1/00
(52) U.S. Cl. ...................... 137/1; 137/204; 137/624.2; 169/17
(58) Field of Search ...................... 137/1, 204, 624.2; 169/17

(56) References Cited

U.S. PATENT DOCUMENTS

| | | | | |
|---|---|---|---|---|
| 2,642,675 A | * | 6/1953 | Hertenstein | 137/204 |
| 3,329,215 A | * | 7/1967 | Kane | 169/17 |
| 4,135,542 A | * | 1/1979 | Chisholm | 137/204 |
| 4,353,387 A | * | 10/1982 | Bouygues et al. | 137/204 |
| 4,849,739 A | | 7/1989 | Loiacono | |
| 5,080,126 A | | 1/1992 | De Rycke et al. | |
| 5,144,974 A | | 9/1992 | Gaudin | |
| 5,533,545 A | | 7/1996 | Robinson | |
| 6,003,538 A | | 12/1999 | Smith | |
| 6,102,066 A | | 8/2000 | Craig et al. | |

OTHER PUBLICATIONS

National Fire Protection Association, *Installation of Sprinkler Systems*, Standard 13, 1996 Edition, p. 13–55.

* cited by examiner

*Primary Examiner*—Gerald A. Michalsky
(74) *Attorney, Agent, or Firm*—Paul E. Knowlton; Kilpatrick Stockton LLP

(57) ABSTRACT

An automatic auxiliary condensate drain for an automatic dry-pipe type fire protection sprinkler system, wherein condensation which forms within the sprinkler system due to changes in temperature is drained from the condensate reservoir at the direction of a programmable controller. The programmable controller coordinates the opening and closing of inlet and outlet valves so that accumulated condensate is drained from the system, yet the pressurized gas located in the sprinkler system is not allowed to escape. Actuators operate the inlet and outlet valves in response to signals from the programmable controller.

4 Claims, 1 Drawing Sheet

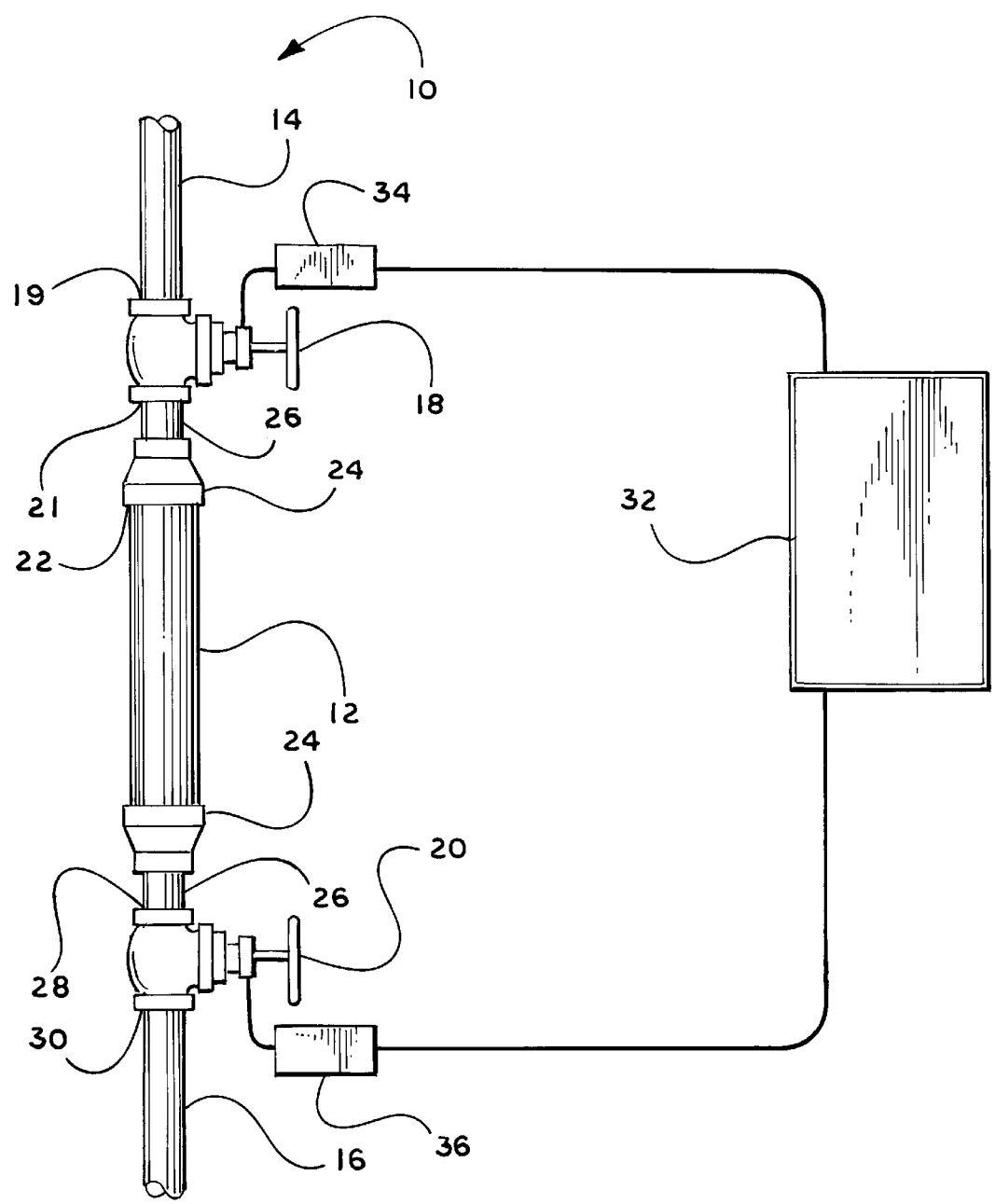

AUTOMATIC DRAIN FOR A FIRE PROTECTION SPRINKLER SYSTEM

FIELD OF THE INVENTION

This invention relates to a condensate drain for a fire protection sprinkler system of the dry-pipe type, and more particularly, to a condensate drain for a dry-pipe type fire protection sprinkler system that is automatically controlled by a programmable controller.

BACKGROUND OF THE INVENTION

Automatic sprinklers are the most widely used fixed apparatus for fire protection. Automatic sprinkler systems typically comprise a host of sprinklers connected in a systematic pattern over a protected area, an adequate water supply, and an internal piping system. Further, an automatic sprinkler system is comprised of a horizontal array of branch lines which are located in the ceiling of each floor of a building and supply the sprinklers with water. A sprinkler can extend above a branch line, placing the sprinkler close to the ceiling, or a sprinkler can extend below a branch line and be mounted flush with a drop ceiling so that only part of the sprinkler is exposed below the ceiling.

The sprinklers and branch lines are supplied with water via risers that are connected to water mains which are further connected to a municipal water source or other water supply. Water is primarily distributed to the sprinkler either through a wet-pipe system or a dry-pipe system. In a wet-pipe system, typically used in heated buildings, all pipes contain water under pressure for immediate release through any sprinkler that opens. The wet-pipe system contains non-flowing water which poses a higher risk of mechanical damage should the water in the branch lines freeze. However, this risk is not present in a continuous flow system or in a dry-pipe system.

In the dry-pipe system, which is normally used in any area exposed to freezing, branch lines and other distribution pipes contain dry air or nitrogen under pressure. The pressurized gas causes a dry-pipe valve to remain in a closed position at the riser. Water is delivered to the fire through the sprinkler in a dry-pipe system when heat from a fire opens the sprinkler. Once the sprinkler is open, pressurized gases escape and causes the dry-pipe valve to open, thereby allowing water to enter and fill the branch lines. The water eventually escapes through the sprinkler heads.

Both the dry-pipe and wet-pipe systems require means to enable the system to be drained. In the dry-pipe system, it is typical practice to provide an auxiliary drain to facilitate periodic drainage. The primary purpose of the auxiliary drain in a dry-pipe type system is to drain condensate that has collected in the system due to changes in temperature of the ambient air surrounding the risers and lines.

It is known in the art that auxiliary condensate drains are disposed in a riser pipe and have an inlet in fluid communication with the pipe network of the system and an outlet in fluid communication with a disposal system. The inlet and outlet ends of the condensate drain are controlled with suitable valves. A fluid reservoir for collecting condensate from the system is disposed between the inlet and outlet valves. A typical condensate reservoir is formed of a main pipe having a two-inch outside diameter (OD) and a length of approximately 12 inches. The inlet end of the inlet valve is attached to the outlet of a riser of the sprinkler system, while the outlet end is coupled to the inlet of the main reservoir pipe. The inlet end of the outlet valve is connected to the outlet side of the condensate reservoir and leads to a disposal system, thereby allowing discharge of the condensate from the condensate reservoir.

Currently, the condensate drain must be manually operated on a regular basis to relieve the piping system of the accumulated condensation in order to prevent mechanical damage from freezing conditions. As a result, the current system is inefficient, costly to maintain, subject to human error as it requires constant human monitoring and expensive to replace should the system be allowed to freeze and rupture the piping system.

Therefore, a need exists for automatically and reliably controlling an auxiliary condensate drain in a dry-pipe type fire protection sprinkler system so that condensate is timely removed from the sprinkler system.

SUMMARY OF THE INVENTION

Set forth below is a brief summary of the invention that solves the foregoing problems and provides benefits and advantages in accordance with the purposes of the present invention as embodied and broadly described therein.

Generally speaking, a preferred embodiment is comprised of a condensate reservoir disposed between an inlet valve and an outlet valve. The inlet valve controls the intake of pressurized gases and condensate into the condensate reservoir. The inlet side of the inlet valve is connected to the fire sprinkler system and the outlet side of the inlet valve discharges condensate to the condensate reservoir. The outlet valve regulates discharge of condensate that has accumulated in the condensate reservoir. Each valve is power-actuated by a suitable actuator such as a solenoid or the like. In a preferred embodiment, the inlet and outlet valves are attached to an inlet solenoid and an outlet solenoid, respectively. The solenoids open and close the valves at the direction of a programmable controller.

The programmable controller is used to coordinate the opening and closing of the inlet and outlet valves based upon criteria that has been previously entered by a user, such as a building engineer or operator, or by a manufacturing entity. The programmable controller initiates the opening or closing of the inlet or outlet valve by signaling the actuator corresponding to the valve desired to be operated. Thereafter, the actuator either opens or closes the valve.

In one method of operation, the inlet valve is in an open position and the outlet valve is in a closed position while the system is inactive. This position allows the condensate reservoir to collect condensate as condensation forms in the sprinkler system. Once the programmable controller determines that the accumulated condensate should be removed from the system based upon previously determined parameters, the controller signals the inlet actuator to close the inlet valve. With the inlet valve closed, the controller signals the outlet actuator to open the outlet valve. After a predetermined time period, sufficient in length to allow the accumulated condensate to drain from the reservoir, the controller signals the outlet actuator to close the outlet valve. Thereafter, the controller signals the inlet actuator to open the inlet valve. The inlet valve remains open during the period of inactivity until the programmable controller begins the cycle once again.

In another method of operation, the inlet and outlet valves are in closed positions while the system is inactive. As a result, the programmable controller must first open the inlet valve for a specified time period to allow the condensate to drain in to the reservoir for removal. The remaining steps of the process remain unchanged from those set forth above, except that the inlet valve does not remain open during the period of inactivity.

In yet another method of operation, the inlet is closed and the outlet valve is open while the system is inactive. The programmable controller must first close the outlet valve. The inlet valve is then opened to allow the condensate from the system to drain into the condensate reservoir. The remaining steps of this embodiment are set forth in the first method described above. At the conclusion of draining the condensate, the outlet valve remains open.

Currently, there exists no device which solves the problems set forth below. Specifically, there exists a need for automatically draining a sprinkler system used for fire protection in order to prevent exposure of the sprinkler system to mechanical damage caused by freezing water while preventing the release of pressurized gas contained within the sprinkler system. Further, it is desired that operation of the condensate drain system not require on-site personnel to manually drain condensation from the system on a regular basis. Additionally, the automatic control contained within the device must possess the capability of being programmed to drain the system at any interval. Finally, there exists a need to reduce the operating costs associated with manually draining a dry-type fire protection sprinkler system.

The instant invention solves the problems set forth above with a condensate reservoir for collecting condensation from a sprinkler system, an inlet valve connected to the sprinkler system and the condensate reservoir which prevents the discharge of a pressurized gas from the sprinkler system, an outlet valve controlling release of condensate from the condensate reservoir, an inlet solenoid for opening and closing the inlet valve, an outlet solenoid for opening and closing the outlet valve, and a programmable controller having the capability of controlling and operating at least one of the valves.

BRIEF DESCRIPTION OF DRAWINGS

The accompanying drawing is a schematic elevation view illustrating a sprinkler-system condensate drain, according to a preferred embodiment of the present invention, for use in a dry-pipe type automatic sprinkler system.

DETAILED DESCRIPTION OF THE DRAWINGS

As shown in the FIGURE, the condensate drain indicated generally at 10 includes a condensate reservoir 12. The condensate drain 10 is disposed between an inlet riser 14 that is connected to a dry-pipe sprinkler system and an outlet riser 16 that is connected to a storm water discharge system (not shown). However, in an alternative embodiment the condensate drain 10 is not connected to a storm water discharge system but discharges to the atmosphere.

More specifically, the condensate drain 10 includes an inlet valve 18, a centrally disposed condensate reservoir 12, and an outlet valve 20. The inlet valve 18 and outlet valve 20 may consist of any conventional valve including by way of illustration and not limitation, a gate valve, a globe valve, or a ball valve, together with a suitable powered actuator for the valve. In this embodiment, the inlet valve 18 is a solenoid-actuated valve including an inlet 19 adapted to be threadably connected with inlet riser 14 and an outlet 21 adapted to be threadably connected to a pipe nipple 26. However, inlet valve 18 may be connected to inlet riser 14 and pipe nipple 26 through any conventional means of connecting pipes including soldering or use of pressure fittings.

As illustrated, the inlet 22 of the condensate reservoir 12 is connected to the inlet valve 18 with a reducing coupling 24 and a pipe nipple 26. The condensate reservoir 12 is connected to the outlet valve 20 through the combination of a reducing coupling 24 and a pipe nipple 26. The outlet valve 20 includes an inlet 28 adapted to be threadably connected with a pipe nipple 26 and an outlet 30 adapted to be threadably connected to outlet riser 16. However, outlet valve 20 is not necessarily threadably connected to outlet riser 16. Rather, outlet valve 20 may simply discharge condensate directly from outlet 30. Further, outlet valve 20 may be connected to outlet riser 16 or pipe nipple 26 through any conventional means of connecting pipes, including soldering or pressure fittings.

Inlet valve 18 and outlet valve 20 are controlled by a programmable multiple valve controller 32. Controller 32 may consist of any conventional programmable controller, such as a microprocessor or a timer. In the present embodiment, controller 32 is programmed to control inlet solenoid 34 and outlet solenoid 36 in order to drain the accumulated condensate from the condensation drain 10 using predetermined time intervals. Specifically, controller 32 controls the opening and closing of inlet valve 18 and outlet valve 20 based upon predetermined time periods. Alternatively, controller 32 controls the opening and closing of inlet valve 18 and outlet valve 20 in response to sensors detecting a predetermined change in temperature or the amount of accumulated condensation in the reservoir.

In operation, inlet valve 18 is in an open position, while outlet valve 20 is in a closed position. Starting from such a position allows condensate to accumulate in the condensate reservoir 12 during all periods of inactivity in which valve 18 is open. In order to drain the accumulated condensate, controller 32 sends a signal to the inlet solenoid 34 to close the inlet valve 18. Once the inlet valve 18 is closed, controller 32 sends a signal to the outlet solenoid 36 to open the outlet valve 20. Outlet solenoid 36 opens the outlet valve 20, thereby draining the condensate collected in the condensate reservoir 12. Upon expiration of a predetermined time period, controller 32 signals the outlet solenoid 36 to close the outlet valve 20 and the inlet solenoid 34 to open the inlet valve 18, returning the system to an inactive state.

Another method of operation of the invention includes starting with inlet valve 18 and outlet valve 20 in closed positions. Once the controller 32 determines that a release of condensate is desired, the controller 32 signals the inlet solenoid 34 to open the inlet valve 18 for a desired period of time. Upon expiration of this time period, inlet solenoid 34 closes inlet valve 18. The controller 32 then signals to the outlet solenoid 36 to open the outlet valve 20. Outlet solenoid 36 opens the outlet valve 20 thereby releasing the accumulated condensate from the condensate reservoir 12. Upon expiration of a predetermined time period, controller 32 signals the outlet solenoid 36 to close the outlet valve 20. Once outlet valve 20 is closed, the system is inactive until the programmable controller begins the cycle once again.

Yet another method of operation of the invention includes starting with the inlet valve 18 in a closed position, while the outlet valve 20 is in a open position. In order to drain the accumulated condensate, controller 32 sends a signal to the outlet solenoid 36 to close the outlet valve 20. Once the outlet valve 20 is closed, controller 32 sends a signal to inlet solenoid 34 to open inlet valve 18. Inlet solenoid 34 opens the inlet valve 18, thereby collecting the condensate in the condensate reservoir 12. Upon expiration of a predetermined time period, sufficient in length to allow the condensate to drain from the sprinkler system, controller 32 signals the inlet solenoid 34 to close the inlet valve 18 and the outlet solenoid 36 to open the outlet valve 20. Thereafter, outlet solenoid 36 opens outlet valve 20, thereby allowing the accumulated condensate to drain from the condensate reservoir 12. Thereafter, the system returns to an inactive state, maintaining inlet valve 18 in an open position and outlet valve 20 in a closed position.

While various embodiments of this invention have been described above, these descriptions are given for purposes of illustration and explanation. Variations, changes, modifications, and departures from the systems and methods disclosed above may be adopted without departure from the spirit and scope of this invention.

I claim:

1. In combination with a dry-type sprinkler system, a method for controlling the release of condensate, the method comprising:

connecting an inlet actuator to an inlet valve attached to the sprinkler system upstream of a condensate reservoir, wherein the inlet valve is in an open position;

connecting an outlet actuator to an outlet valve attached to the sprinkler system downstream of the condensate reservoir, wherein the outlet valve is in a closed position;

determining a time-based operation interval during which the inlet valve remains open and the outlet valve remains closed, allowing condensate to collect in the reservoir;

determining a time-based release interval during which the collected condensate is released from the reservoir;

initiating the operation interval;

when the operation interval has elapsed, initiating the release interval and thereby automatically causing the inlet actuator to close the inlet valve;

after the inlet valve is closed in the release interval, automatically causing the outlet actuator to open the outlet valve for a time predetermined by the release interval, thereby releasing the collected condensate;

when the release interval has elapsed, resetting the release interval and thereby automatically causing the outlet actuator to close the outlet valve;

after the outlet valve is closed, automatically causing the inlet actuator to open the inlet valve; and resetting the operation interval.

2. In combination with a dry-type sprinkler system, a method for controlling the release of condensate, the method comprising:

connecting an inlet actuator to an inlet valve attached to the sprinkler system upstream of a condensate reservoir, wherein the inlet valve is in a closed position;

connecting an outlet actuator to an outlet valve attached to the sprinkler system downstream of the condensate reservoir, wherein the outlet valve is in a closed position;

determining a time-based operation interval during which the inlet valve is opened and the outlet valve remains closed;

determining a time-based drain interval during which condensate is collected in the reservoir;

determining a time-based release interval during which the collected condensate is released from the reservoir;

initiating the operation interval;

when the operation interval has elapsed, initiating the drain interval and thereby automatically causing the inlet actuator to open the inlet valve;

when the drain interval has elapsed, resetting the drain interval, initiating the release interval, and automatically causing the inlet actuator to close the inlet valve;

after the inlet valve is closed, automatically causing the outlet actuator to open the outlet valve;

when the release interval has elapsed, resetting the release interval, and automatically causing the outlet actuator to close the outlet valve; and resetting the operation interval.

3. In combination with a dry-type sprinkler system, a method for controlling the release of condensate, the method comprising:

connecting an inlet actuator to an inlet valve attached to the sprinkler system upstream of a condensate reservoir, wherein the inlet valve is in a closed position;

connecting an outlet actuator to an outlet valve attached to the sprinkler system downstream of said condensate reservoir, wherein the outlet valve is in an open position;

determining a time-based operation interval during which the inlet valve is opened and the outlet is closed;

determining a time-based drain interval during which condensate is collected in the reservoir;

determining a time-based release interval during which the collected condensate is released from the reservoir;

initiating the operation interval;

when the operation interval has elapsed, initiating the drain interval, automatically causing the outlet actuator to close the outlet valve, and automatically causing the inlet actuator to open the inlet valve;

when the drain interval has elapsed, resetting the drain interval, initiating the release interval, and automatically causing the inlet actuator to close the inlet valve;

after the inlet valve is closed, automatically causing the outlet actuator to open the outlet valve;

resetting the operation interval.

4. In combination with a dry-type sprinkler system, a method for controlling the release of condensate, the method comprising:

connecting an inlet valve to the sprinkler system upstream of a condensate reservoir;

connecting an outlet valve to the sprinkler system downstream of the condensate reservoir;

determining a time-based operation interval during which the inlet valve remains open and the outlet valve remains closed, allowing condensate to collect in the reservoir;

determining a time-based release interval during which the collected condensate is released from the reservoir;

initiating the operation interval;

when the operation interval has elapsed, initiating the release interval and thereby closing the inlet valve;

after the inlet valve is closed in the release interval, opening the outlet valve for a time predetermined by the release interval, thereby releasing the collected condensate;

when the release interval has elapsed, resetting the release interval so as to reclose the outlet valve and reopen the inlet valve; and resetting the operation interval.

* * * * *